Aug. 25, 1959     F. E. W. SCHNEIDER     2,900,826

ERECTION SYSTEMS FOR GYROSCOPES

Filed Dec. 18, 1956     2 Sheets-Sheet 2

INVENTOR
FREDERICK E.W. SCHNEIDER
BY Toulmin & Toulmin
ATTORNEYS

United States Patent Office 2,900,826
Patented Aug. 25, 1959

2,900,826

ERECTION SYSTEMS FOR GYROSCOPES

Frederick E. W. Schneider, Boreham Wood, Elstree, England, assignor to Engel & Gibbs Limited, Boreham Wood, Elstree, England Application December 18, 1956, Serial No. 629,151

Claims priority, application Great Britain April 18, 1956

8 Claims. (Cl. 74—5.47)

This invention relates to electrically operated erection systems for gyroscopes and in particular to pilot operated erection systems for aircraft gyroscopic instruments of the kind employing one or more control devices such as mercury control switches which are responsive to the position of the gyroscope to break the electrical circuits when the gyroscope is fully erected.

In such systems it has been usual for each switch to control two separate electrical circuits for erecting the gyroscope, one being a normal erection circuit connected to a relatively low power source and operable to erect the gyroscope at a rate of about five degrees per minute, and the other being a fast erection circuit connected to a relatively high power source and operable to erect the gyroscope at a rate of about 120 degrees per minute.

The provision and use of such fast erection circuits for the gyroscopic instruments of modern aircraft is essential so as to ensure their correct operation during a quick take-off or after a violent manoeuvre.

Prior to the present invention the fast erection circuit of the system has been provided with a pilot operable switch generally in the form of a button, which is depressed by the pilot when fast erection of the gyroscopes is required. In such prior systems the pilot kept the fast erection button depressed for about thirty seconds or until he was satisfied that the gyroscopes were fully erected.

The prior system has a number of serious disadvantages.

Firstly the pilot must hold the erection button depressed manually for about thirty seconds and this may be undesirable especially if the aircraft is involved in combat manoeuvres.

Secondly the fast erection button is frequently kept depressed by the pilot after the gyroscope is fully erected with the result that the torque motors are alternately energised in each direction to produce an undesirable hunting of the gyroscope about its fully erected position. This movement is sometimes of the order of 2 degrees and causes considerable wear on the gyroscope bearings and on the electrodes of the control switches.

It is an object, therefore, of the present invention to provide an improved erection system for a gyroscope which avoids the above disadvantages and which will rapidly erect the gyroscope to its correct erected position upon depression of the pilot's button.

According to the present invention the fast erection circuit includes a holding relay, which is energised in response to actuation of the pilot's switch to complete the circuit and operates one or more contacts, one of which by-passes the pilot's switch to complete the fast erection circuit until the relay is de-energised when the circuit is broken by the control device as the gyroscope reaches its erected position.

In one arrangement according to the invention the circuit may include a series current operated holding relay while in a second embodiment the circuit includes a voltage operated relay, each relay being connected in the fast erection circuit.

The holding relays may be A.C. or D.C. operated but if the supply current is from an alternating source it is preferred to incorporate a bridge rectifier in the erection circuit and to use a D.C. operated relay.

In the application of the invention to an artificial horizon, the gyroscope is erected by a pair of torque motors each under the control of a switch preferably mounted on the casing of the gyroscope in such a manner as to be responsive respectively to movements of the gyroscope about the pitch and roll axes. Each control switch includes an electrode connected to a fast erection circuit having a holding relay according to the invention for energising the torque motors and for automatically de-energising the motors as the gyroscope attains its erected position.

It will be appreciated that the fast erection circuit will operate completely automatically once the circuit has been initially completed by depression of the pilot's button. If desired, therefore, an emergency switch may be incorporated in the system for breaking the fast erection circuit.

Furthermore, the relay may be used to operate ancillary circuits, such as indicators giving a visual or audible indication to the pilot that the gyroscope is fully erected.

The invention will now be described by way of example with reference to the accompanying drawings, in which.

Figure 1:
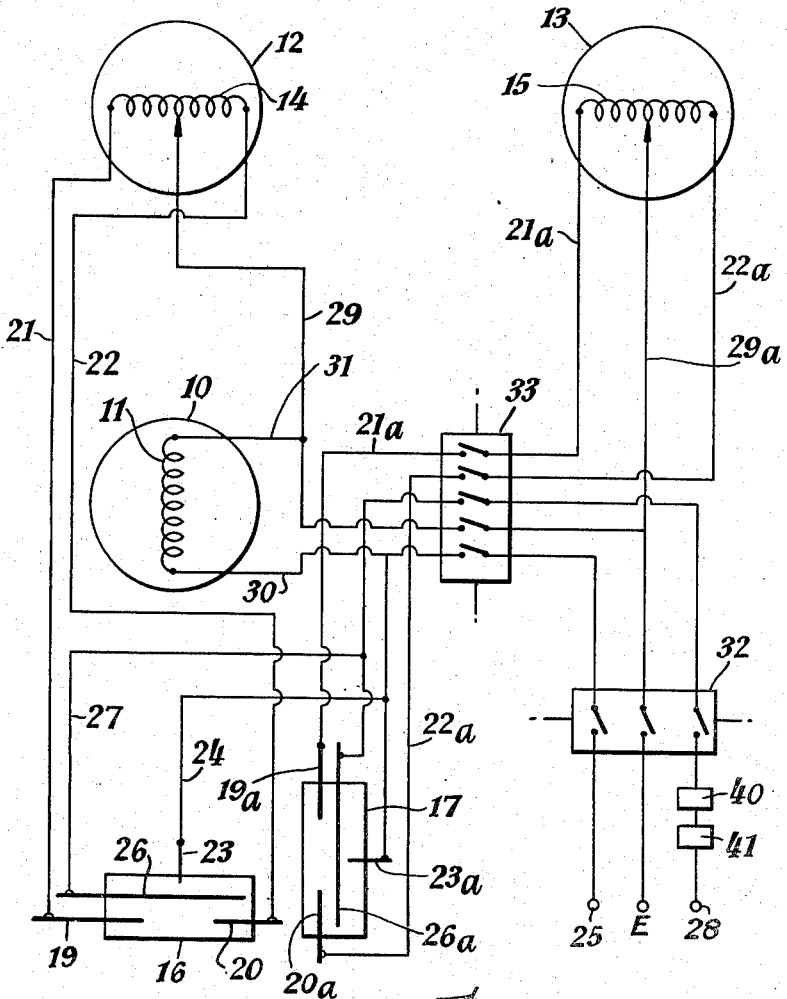
Figure 1 is a circuit diagram showing the application of the invention to the erection system of a gyroscope.

Referring now to Figure 1 of the drawings there is shown diagrammatically a circuit arrangement for the erection system of a vertical gyroscope such as an artificial horizon. The gyro rotor is shown diagrammatically at 10 and its stator winding at 11. The induction torque motors are shown at 12 and 13, each motor including a winding shown at 14 and 15, the windings being connected with a source of current through control devices as will be hereinafter described.

A pair of control devices shown as sensitive mercury control switches 16 and 17 are mounted on the casing or a suitable gimbal of the gyroscope so that in the erected position of the gyroscope the switches will both be horizontal. The switch 16 is located so as to be responsive to movement of the gyroscope about the roll axis while the switch 17 is mounted to be responsive to movements of the gyroscope about the pitch axis.

Figure 2:
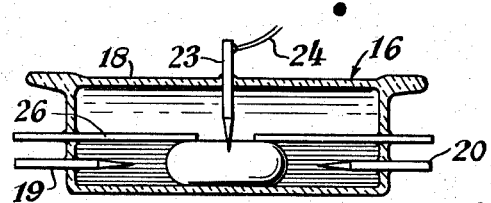
Figure 2 is a longitudinal section through a control switch suitable for use in such a circuit.

The control switches are preferably of the character described and claimed in Figure 8 of the copending application of Engel et al., No. 441,878, now Patent No. 2,830,160. The switches are shown in Figure 2 of the present application and comprise a glass envelope 18 through the end walls of which are inserted pointed electrodes 19 and 20 connected respectively by wires 21 and 22 to the ends of the winding 14 of the torque motor 12. The control switch also includes an upper central electrode 23 connected by a wire 24 to a source 25 of low power supply, for example 26 volts. The control switch further includes a longitudinally disposed electrode 26 connected by the wire 27 to a source 28 of high power supply, for example 115 volts.

The construction of the control switch 17 is identical to that of control switch 16 and in the drawing the parts have, therefore, been marked with the same reference numerals to which the suffix a has been added.

Each of the windings 14 and 15 of the torque motors 12 and 13 are centre tapped and connected to earth through the return wires 29, 29a. The winding 11 of the rotor 10 is connected to the low power source by the wire 30 and to earth by the wire 31.

The system includes contact strips on each of the gimbal axes, the strips being shown diagrammatically at 32 and 33.

The system described above is intended for D.C. operation but it will be appreciated that the system is equally operable from a single phase A.C. supply. The system may also be modified to operate from a three-phase alternating supply in which case the torque motors may each include four star connected windings in which two of the windings are permanently connected to two of the supply phases, while one or other of the remaining windings is connected by the associated control switch to the third supply phase to produce a rotating field in the appropriate direction.

Figure 3:
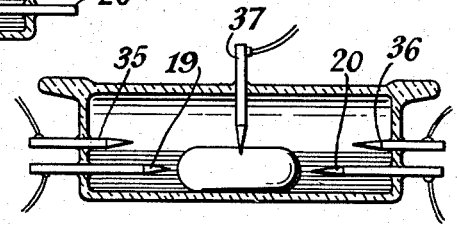
Figure 3 is a sectional plan view of a further control switch suitable for use in the erection system of Figure 1.

In Figure 3 of the drawings there is shown a modified form of control switch 34 having the usual electrodes 19 and 20 for connection to the windings of the associated induction motor. The switch includes electrodes 35 and 36 connected to the fast erection circuit and electrode 37 connected to the normal erection circuit. The electrodes 19 and 20 project slightly more into the envelope of the switch than the electrodes 35 and 36 so that as the control switch assumes its horizontal position the fast erection circuit is broken prior to the normal erection circuit so that arcing and subsequent wear of the fast electrodes will be prevented.

Figure 4:
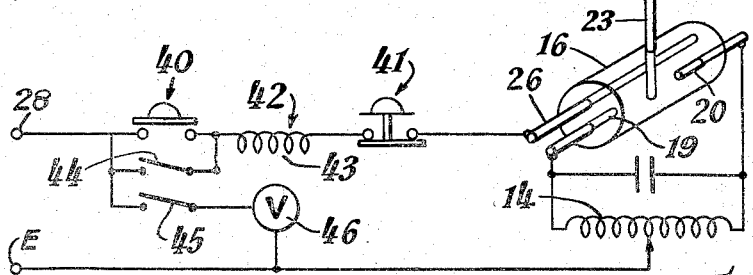
Figure 4 is a circuit diagram of a part of the system of Figure 1 showing in detail a current operated relay for the fast erection circuit.

Referring now to Figure 4 there is shown diagrammatically the circuit connections to one of the torque motors, for example the motor 12. The source 28 of high power supply is connected to the fast electrode 26 of the control switch 16 through a pair of switches 40 and 41, the position of which is shown diagrammatically in Figure 1. The switch 40 is normally open and is provided with a button for operation by the pilot to close the switch to bring into operation the fast erection circuit for the erection motors 12 and 13. The circuit further includes a holding relay 42 shown as a series current operated coil 43, energisation of which is adapted to close the contacts 44 by-passing the pilot operated switch 40. The relay 42 is further adapted to close contacts 45 operating a visual or audible indicator 46 to give a warning to the pilot that the fast erection circuit is in operation.

The switch 41 is an emergency switch which is normally in the closed position but which may be opened by the pilot to break the fast erection circuit in an emergency.

In operation, when the gyroscope is inoperative, the control switch 16 is tilted and the fast erection button 40 must be depressed by the pilot to complete a circuit to energise one or the other half of the stator winding 14 of the torque motor 12 to erect the gyroscope. The depression of the pilot's button 40 immediately energises the holding relay 42 which operates its associated contact 44 to complete the holding circuit irrespective of the pilot's switch 40. The fast erection circuit, the current in which may be in the region of 270 milliamps, rapidly erects the gyroscope at a rate of about 120 degrees per minute and just prior to erection the normal erection circuit is completed through the central electrode 23. As the gyroscope reaches its erected position, the control switch 16 attains its horizontal position and both rapid and normal erection circuits are broken. As the rapid erection circuit is broken the holding relay 42 is de-energised and the circuit can therefore only be re-energised by a further operation of the pilot's switch 40.

Due to the rapid erection of the gyroscope the gyroscope tends to move slightly past the erected position and any such movement causes a re-energisation only of the normal erection circuit through electrode 23 to correct this movement. Hunting of the gyroscope due to re-energisation of the rapid erection circuit is therefore prevented. The normal erection circuit further takes care of any precessional movement of the gyroscope, the electrodes being arranged to be sensitive preferably to a six minute tilt of the switch.

The system thus provides a simple arrangement for rapidly and automatically bringing a gyroscope to its erected position. The system avoids hunting of the gyroscope about its erection position, avoids excessive wear on the bearings of the gyroscope and the electrodes of the control switch, and avoids all high surge makes on the electrodes. The relay reduces to a minimum the number of electrodes used in the switch and so gives a minimum number of seals and therefore maximum reliability.

Figure 5:
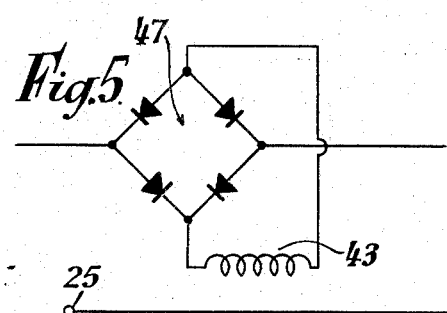
Figure 5 shows a modified arrangement applicable to the circuit of Figure 4 when the relay is D.C. operated from an A.C. supply

Referring now to Figure 5 there is shown a modification to the circuit of Figure 4 when the system is A.C. operated. In such an arrangement it is preferred to include a D.C. operated relay coil which is, therefore, connected across a bridge rectifier 47 connected in the fast erection line from the source 28 of high power supply.

Figure 6:
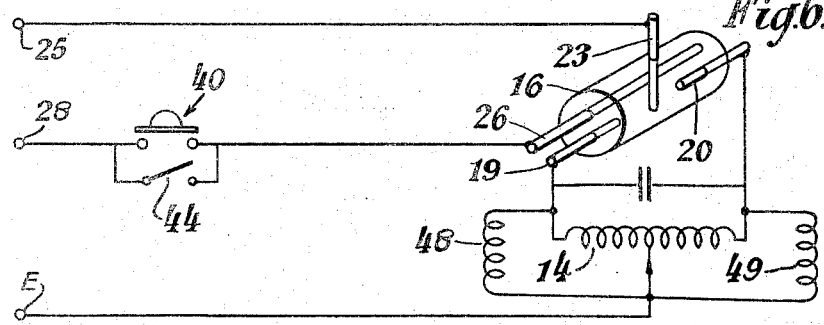
Figure 6 is a circuit diagram of a part of the system of Figure 1 showing in detail a voltage operated relay for the fast erection circuit.

Referring now to Figure 6 there is shown a modification of the circuit of Figure 4 in which the holding relay includes a voltage operated coil. In this arrangement there is provided a pair of holding coils 48, 49 each connected across one half of the winding 14 of the induction motor. Depending upon the tilt of the control switch 16 one or other of the coils 48, 49 will be energised to operate the contacts 44 of the relay. As before, a visual or audible indicator may also be provided together with an emergency switch.

It has been found that under certain random erection conditions the gimbals of the gyroscope may be inclined to react violently to the energisation of the torque motors by the fast erection circuit. This causes the control switch contacts to flutter and the circuit may, therefore, refuse to lock in. If desired, therefore, an additional thermal or timer device may be inserted in the fast erection circuit to hold the circuit closed for the period of flutter but which would be de-energised well before the gyroscope reaches its erection point.

It will be appreciated that the provision of a single control switch on the gyro casing for each direction of movement relies entirely upon preset angles in the switches and is inflexible so far as variation of the "dead spot" or "no contact position" is concerned. If desired, therefore, each control switch can be replaced by a pair of switches so arranged that they can be adjusted at an angle to each other. In this way the dead spot in each direction of movement can be adjusted without reference to the angle of the switch. The limiting factor is, of course, the differential between make-and-break in each switch and this can be arranged to operate over an angle of one minute or less. With this arrangement, therefore any dead spot angle can be set with an accuracy of one minute of arc.

I claim:
1. An erection system for a gyroscope comprising a control device responsive to the position of the gyroscope, an electric motor for erecting said gyroscope and a normal erection circuit for connecting said motor to a source of relatively low power through said control device when the gyroscope is near its erected position, a fast erection circuit operable to connect said motor also to a source of relatively high power through said control device but inoperable when said gyroscope is near its erected position, a normally open switch means in said fast erection circuit for completing said circuit, and a holding relay in said fast erection circuit for maintaining said circuit closed irrespective of the subsequent operation of said switch means until the circuit is broken by the control device.

2. An erection system as claimed in claim 1 for a gyro vertical, said system having a pair of induction torque motors each under the control of a control device.

3. An erection system as claimed in claim 1, wherein the control device comprises an electric conducting liquid control switch.

4. An erection system as claimed in claim 1, wherein the holding relay includes a series current operated coil connected in the fast erection circuit.

5. An erection system as claimed in claim 1, wherein the holding relay includes a pair of voltage operated coils each connected across one-half of the winding of the torque motor.

6. An erection system as claimed in claim 1, wherein the holding relay is operable to control at least one ancillary circuit.

7. An erection system as claimed in claim 6, wherein an ancillary circuit operates a signal indicator for warning the pilot of the operation of the fast erection circuit.

8. An erection system as claimed in claim 1, wherein the fast erection circuit includes a second switch means for breaking the circuit in an emergency.

References Cited in the file of this patent

UNITED STATES PATENTS

| | | |
|---|---|---|
| 2,381,438 | Curry | Aug. 7, 1945 |
| 2,551,069 | Strother | May 1, 1951 |
| 2,588,607 | Barkalow | Mar. 11, 1952 |
| 2,608,099 | Roush | Aug. 26, 1952 |
| 2,737,053 | Swanson | Mar. 6, 1956 |
| 2,746,300 | Seaman | May 22, 1956 |

FOREIGN PATENTS

| | | |
|---|---|---|
| 597,282 | Great Britain | Jan. 22, 1948 |
| 745,186 | Great Britain | Feb. 22, 1956 |